(12) United States Patent
Hart

(10) Patent No.: US 12,465,996 B2
(45) Date of Patent: Nov. 11, 2025

(54) WELDING ROD DISPENSER

(71) Applicant: Max Money Hart, Broken Arrow, OK (US)

(72) Inventor: Max Money Hart, Broken Arrow, OK (US)

( * ) Notice: Subject to any disclaimer, the term of this patent is extended or adjusted under 35 U.S.C. 154(b) by 931 days.

(21) Appl. No.: 17/584,538

(22) Filed: Jan. 26, 2022

(65) Prior Publication Data

US 2022/0234128 A1 Jul. 28, 2022

Related U.S. Application Data

(60) Provisional application No. 63/141,570, filed on Jan. 26, 2021.

(51) Int. Cl.
*B23K 9/133* (2006.01)
*B23K 9/12* (2006.01)

(52) U.S. Cl.
CPC .............. *B23K 9/133* (2013.01); *B23K 9/121* (2013.01)

(58) Field of Classification Search
CPC ................................. B23K 9/121; B23K 9/133
See application file for complete search history.

(56) References Cited

U.S. PATENT DOCUMENTS

| 5,007,597 | A | 4/1991 | Jones | |
|---|---|---|---|---|
| 6,179,065 | B1 * | 1/2001 | Payne | E21B 19/15 175/85 |
| 8,113,762 | B2 * | 2/2012 | Belik | E21B 19/15 414/746.4 |
| 2004/0200819 | A1 | 10/2004 | Kensrue | |

FOREIGN PATENT DOCUMENTS

| CN | 203578616 U | 5/2014 |
|---|---|---|
| CN | 111786229 | * 7/2020 |
| CN | 111786229 A | 10/2020 |
| WO | 2008018961 | 2/2008 |

OTHER PUBLICATIONS

Machine Translation of Hu (Cn 111786229), performed on Jan. 7, 2025 (Year: 2020).*
International Search Report and Written Opinion International PCT Application No. PCT/US22/013818, Korean Intellectual Property Office, May 4, 2022.

* cited by examiner

*Primary Examiner* — Brian W Jennison

(57) ABSTRACT

A welding rod dispenser comprising: a deck, where the deck angles downward from back to front; a rotating assembly located at the front of the deck, where the rotating assembly comprises grabber teeth; and a leveler assembly located atop the deck. Welding rods placed atop the deck may tend to slide forward under the leveler assembly where the leveler assembly levels them into a single layer. Individual welding rods may then be grabbed by the grabber teeth one at a time before being moved forward by the rotating assembly for retrieval by the user.

12 Claims, 11 Drawing Sheets

WELDING ROD DISPENSER

CROSS REFERENCE

This application is based on and claims priority to U.S. Provisional Patent Application No. 63/141,570 filed Jan. 26, 2021.

BACKGROUND OF THE INVENTION

Field of the Invention

This invention relates generally to a welding rod dispenser.

Description of the Related Art

Welding rods, also known as welding sticks or electrodes, are used in welding to conduct current through a workpiece and/or to melt and form a bonding material to join two metal pieces together. A welding rod may be non-consumable, as in gas tungsten arc welding, or consumable, as in gas metal arc welding or shielded metal arc welding. Consumable rods must be replaced regularly as they are used up. While non-consumable rods are not consumed and thus do not need to be replaced as often, they still must be replaced occasionally due to wear.

Welding rods are typically held in a variety of containers, tubes, and racks for storage and access for use. In a fast-paced shop environment, however, such access is not always easy. In addition, there is no way to keep track of how many welding rods are used per day.

Based on the foregoing, it is desirable to provide a welding rod dispenser that automatically dispenses rods for the fast-paced environment of a shop.

It is further desirable for the welding rod dispenser to count each rod dispensed, promoting efficiency and saving money.

It is further desirable for the welding rod dispenser to fit multiple sizes and types of welding rods.

It is further desirable for the welding rod dispenser to be compact and user friendly.

It is further desirable for the welding rod dispenser to keep welding rods contained, neat, and easily accessible.

SUMMARY OF THE INVENTION

In general, in a first aspect, the invention relates to a welding rod dispenser comprising: a deck, where the deck angles downward from back to front; a rotating assembly located at the front of the deck, where the rotating assembly comprises grabber teeth; and a leveler assembly located atop the deck. Welding rods placed atop the deck may tend to slide forward under the leveler assembly and the leveler assembly may be capable of leveling them into a single layer where they are grabbed by the grabber teeth one at a time before being moved forward by the rotating assembly.

The leveler assembly may be adjustable such that the leveler assembly is spaced from the deck at their closest point an adjustable distance. The leveler assembly may comprise at least one leveler, each leveler comprising an L-shaped body and a telescoping arm extending from the body, where the telescoping arm has a distal end with a bend equal to the angle of the deck.

The welding rod dispenser may further comprise a pair of arms extending forward from the rotating assembly such that rods moved forward by the rotating assembly are deposited on the arms. The welding rod dispenser may further comprise a plurality of wheels mounted above and spaced from the deck such that the wheels provide pressure to welding rods located on the deck for even dispensing. The welding rod dispenser may further comprise a motor, where the rotating assembly is turned by the motor. The motor may be located below the deck. The welding rod dispenser may further comprise a motion sensor, where the welding rod dispenser is capable of dispensing a welding rod upon activation by the motion sensor. The motion sensor may be capable of being folded out for use and in for storage and transport. The welding rod dispenser may further comprise a counter capable of counting the number of welding rods dispensed by the welding rod dispenser. The welding rod dispenser may further comprise a set of buttons, a dial, or another number selection device for setting how many rods the user wants dispensed at a time.

In a second aspect, the invention relates to a method of dispensing welding rods, the method comprising: placing a plurality of welding rods atop an angled deck and below a leveler assembly; allowing the welding rods to slide forward down the deck; allowing the welding rods to be leveled into a single layer by the leveler; rotating a rotating grabber assembly with a plurality of grabber teeth such that a single welding rod is grabbed by each of the grabber teeth and is rotated forward; and allowing the single welding rod to fall forward off the rotating grabber assembly. The method may further comprise catching the single welding rod with a pair of arms extending forward of the rotating grabber assembly. The method may further comprise stopping rotating the rotating grabber assembly when the single welding rod falls off such that only one welding rod is dispensed at a time. The method may further comprise activating the rotating grabber assembly via a motion sensor. The method may further comprise adjusting the leveler assembly based on the size of the welding rods.

Figure 1:
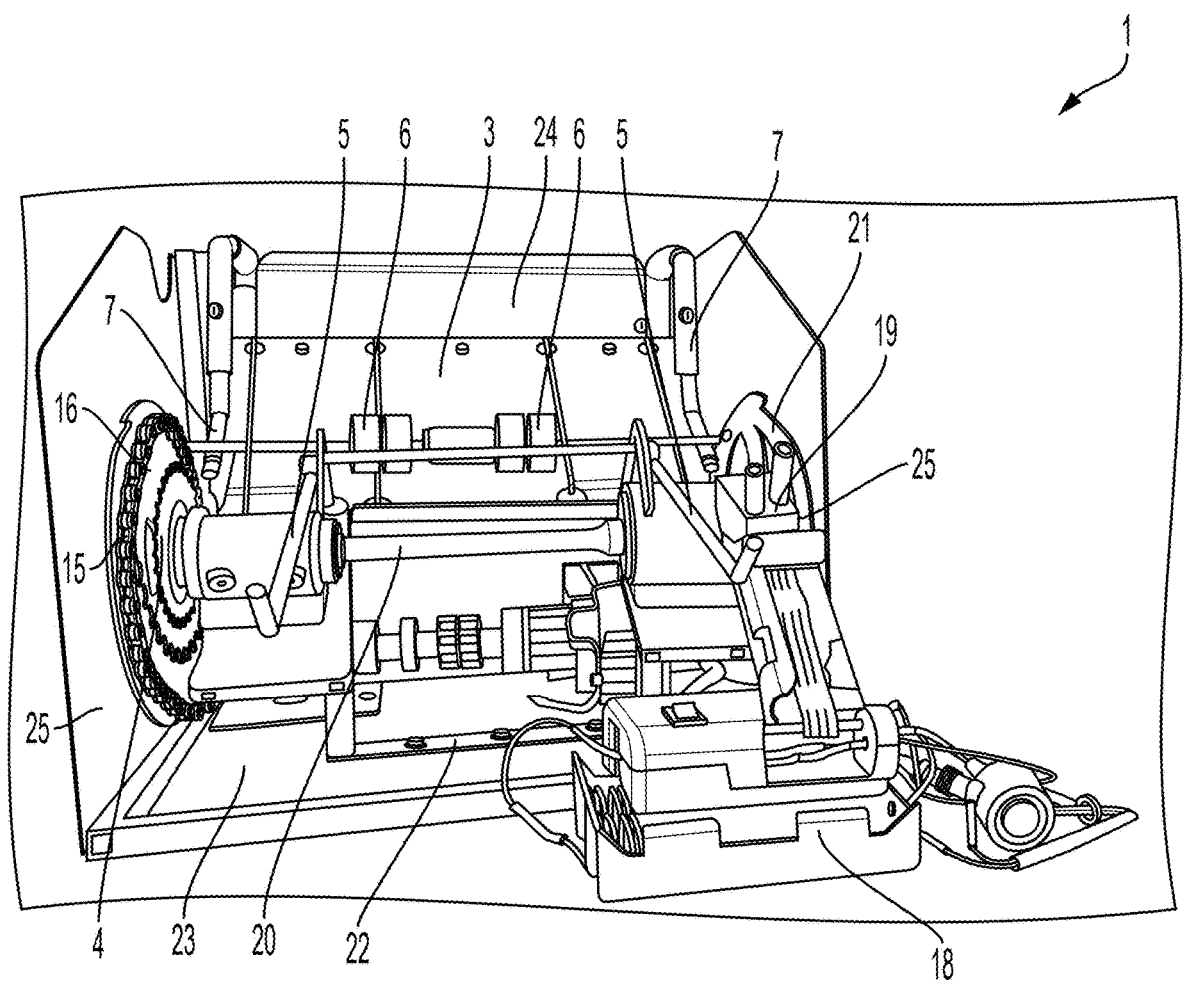
FIG. 1 is a front view of the welding rod dispenser.
Figure 2:
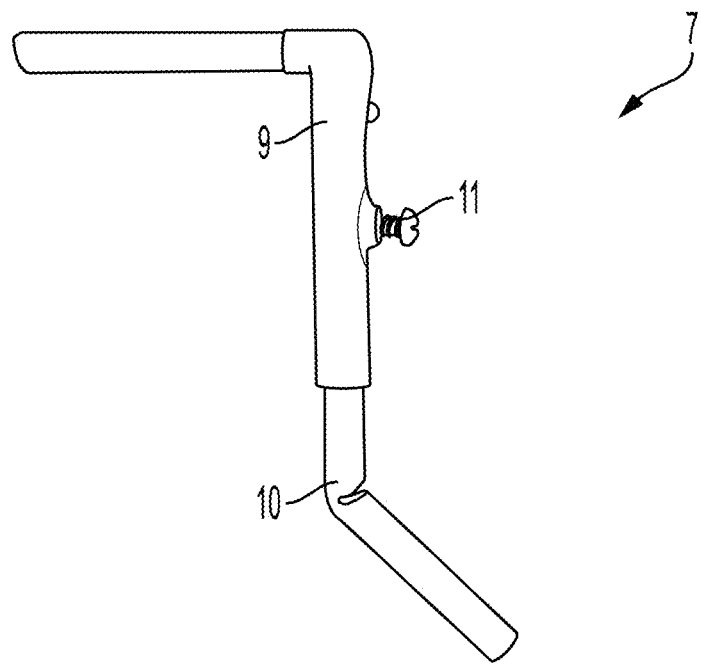
FIG. 2 is a side view of the leveler.
Figure 3:
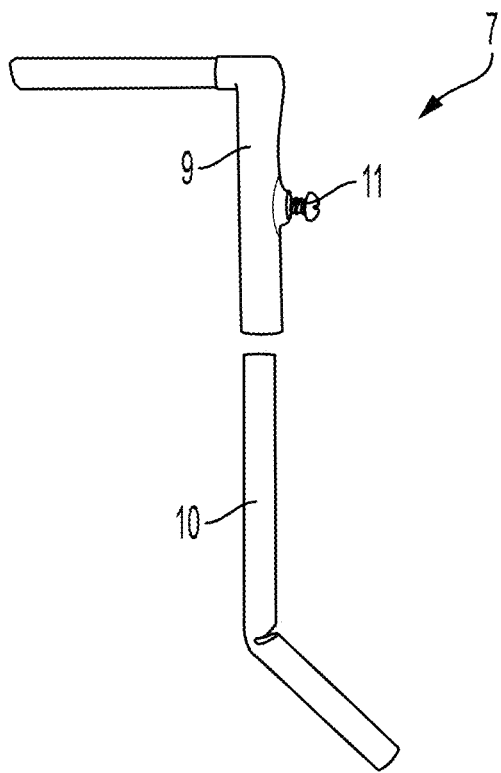
FIG. 3 is an exploded side view of the leveler.
Figure 4:
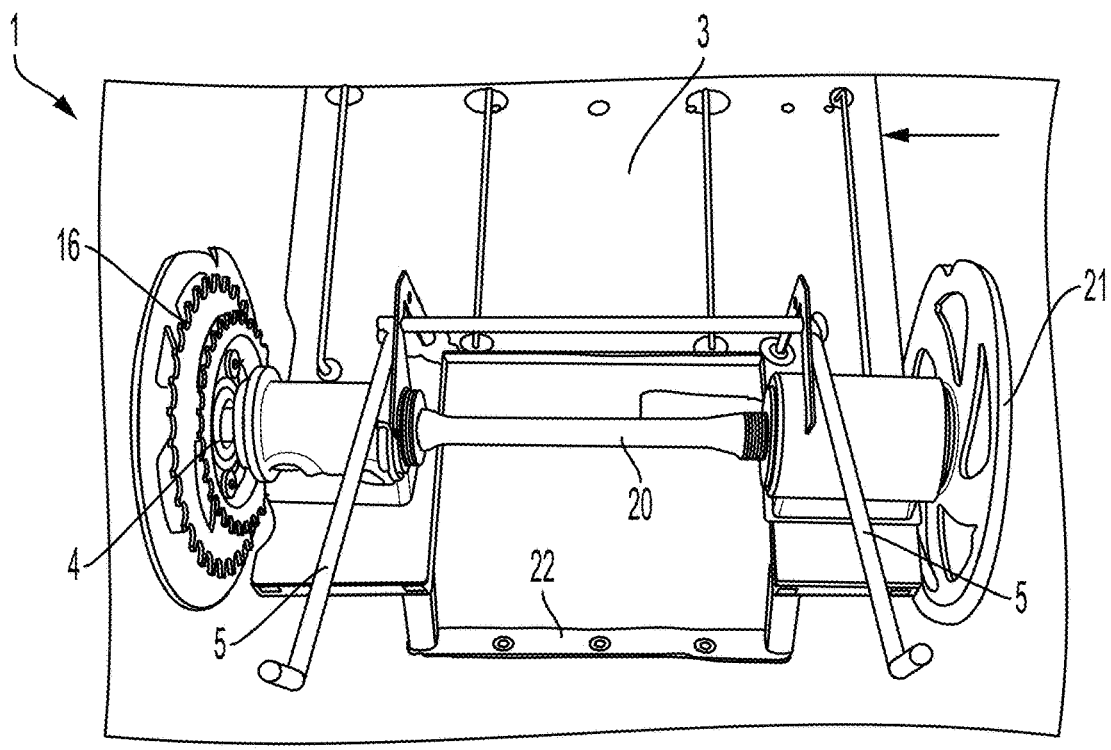
FIG. 4 is a front perspective view of the deck, grabber assembly, and arms.
Figure 5:
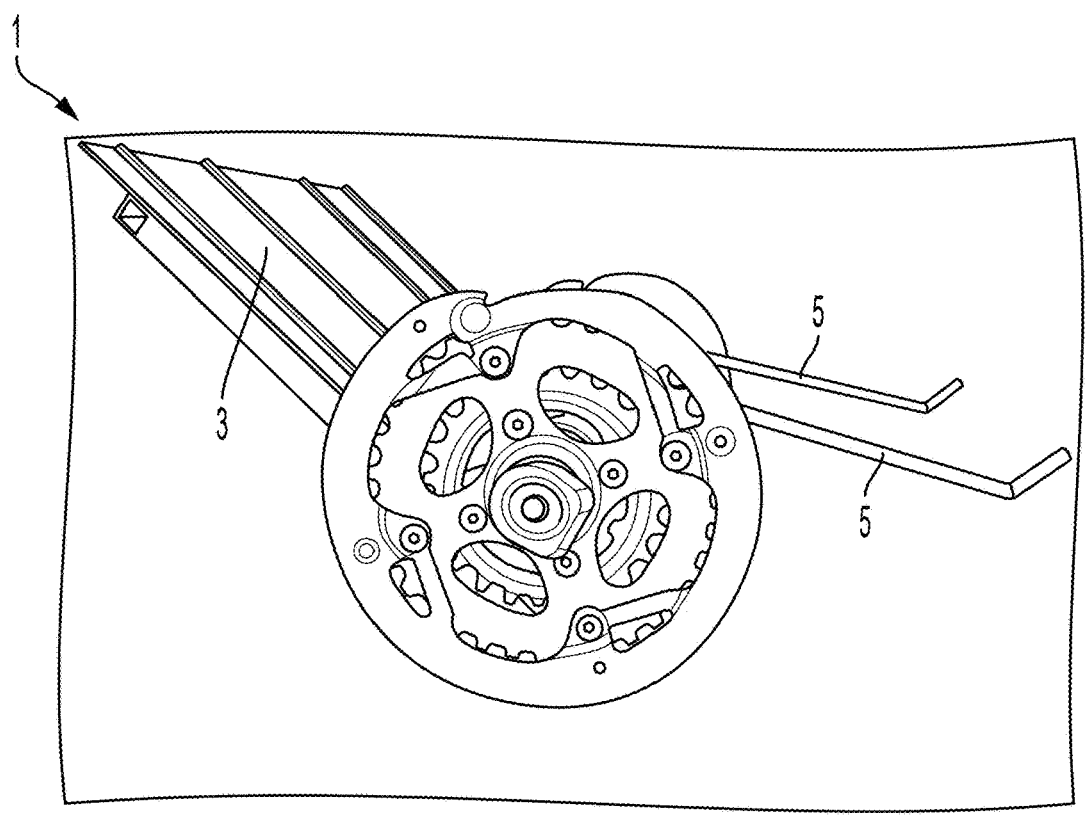
FIG. 5 is a side view of the same.
Figure 6:
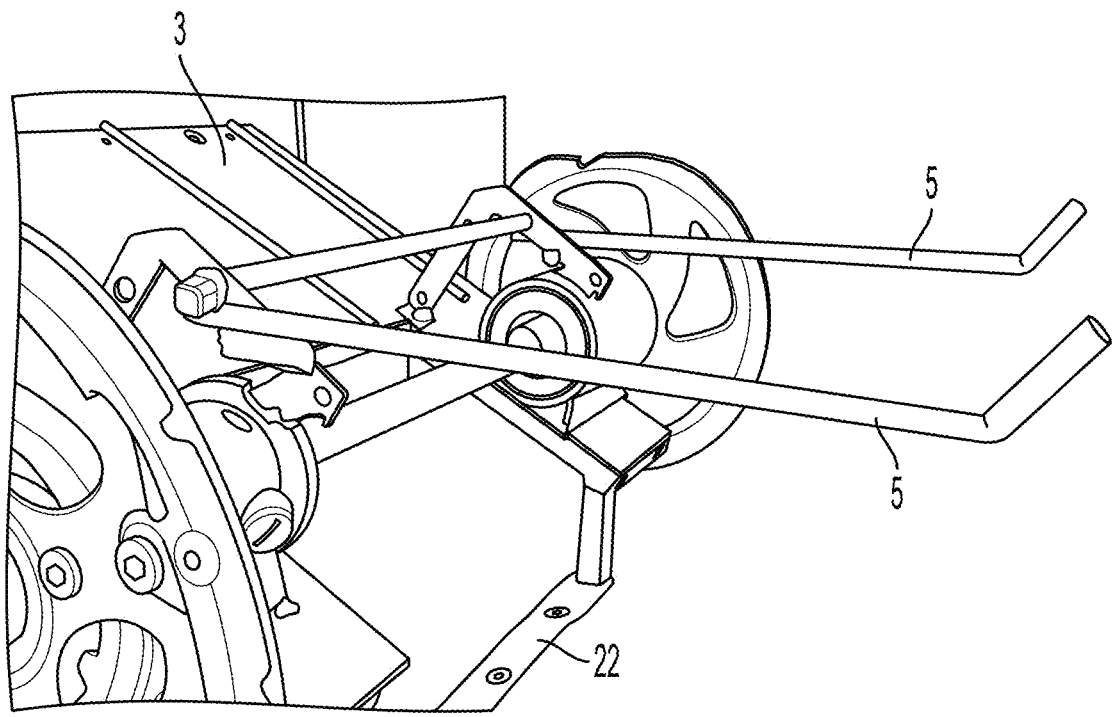
FIG. 6 is a side perspective view of the same.
Figure 7:
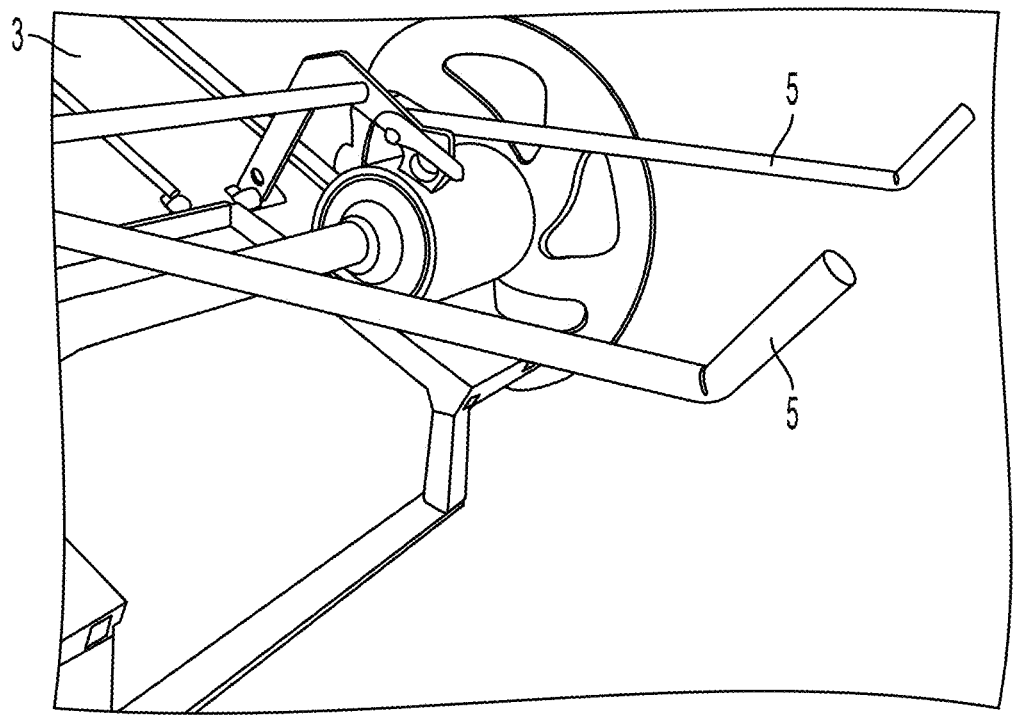
FIG. 7 is a close-up perspective view of the arms.
Figure 8:
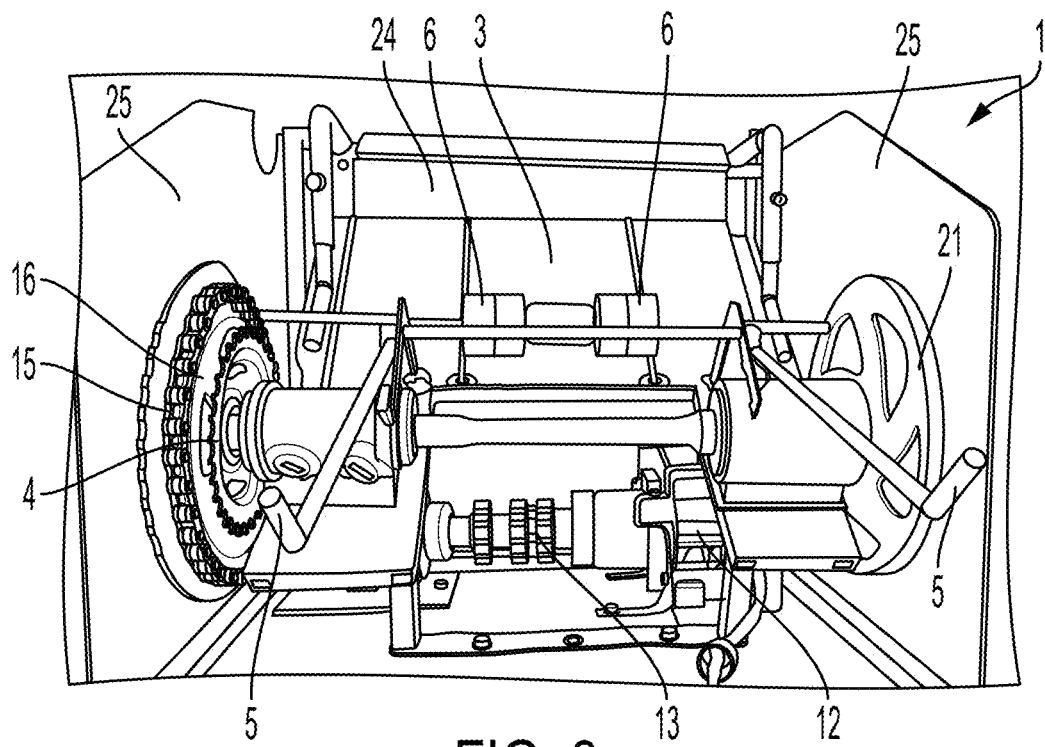
FIG. 8 is a front view of the welding rod dispenser.
Figure 9:
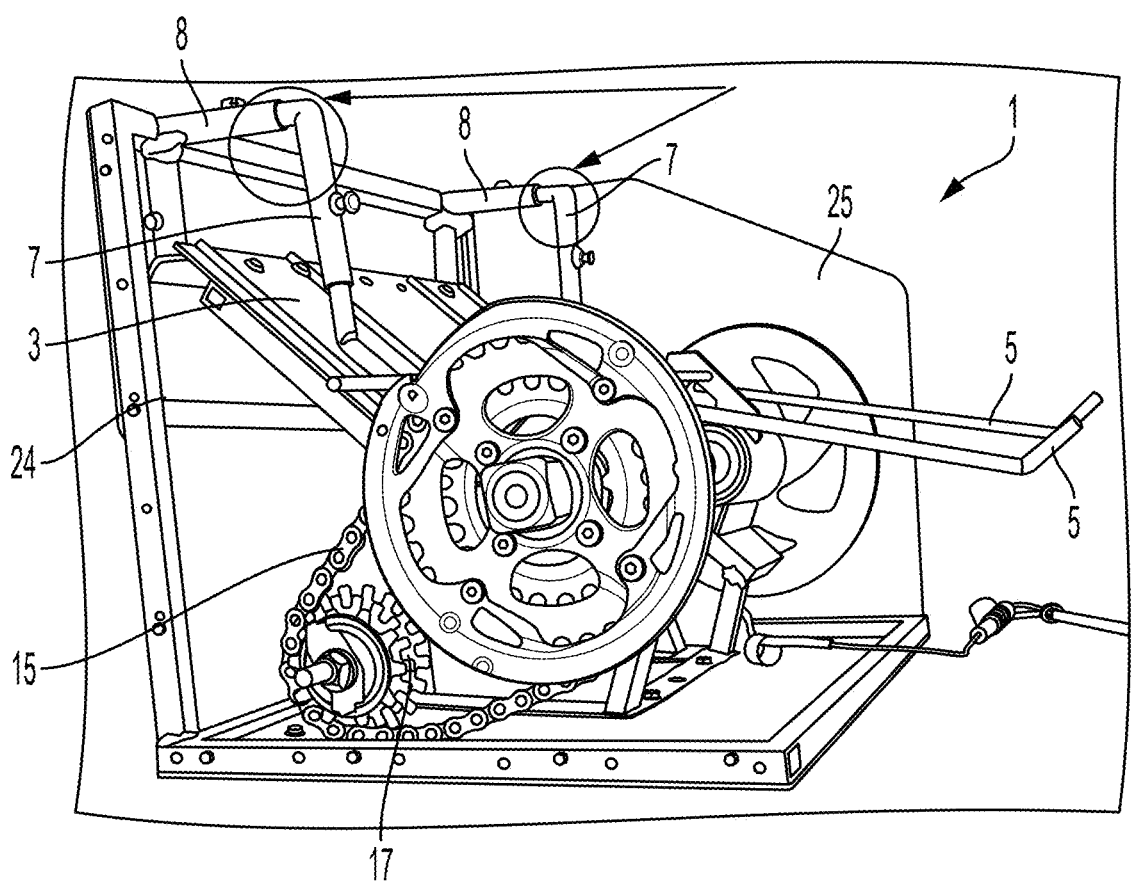
FIG. 9 is a side perspective view of the welding rod dispenser with the side panel removed.
Figure 10:
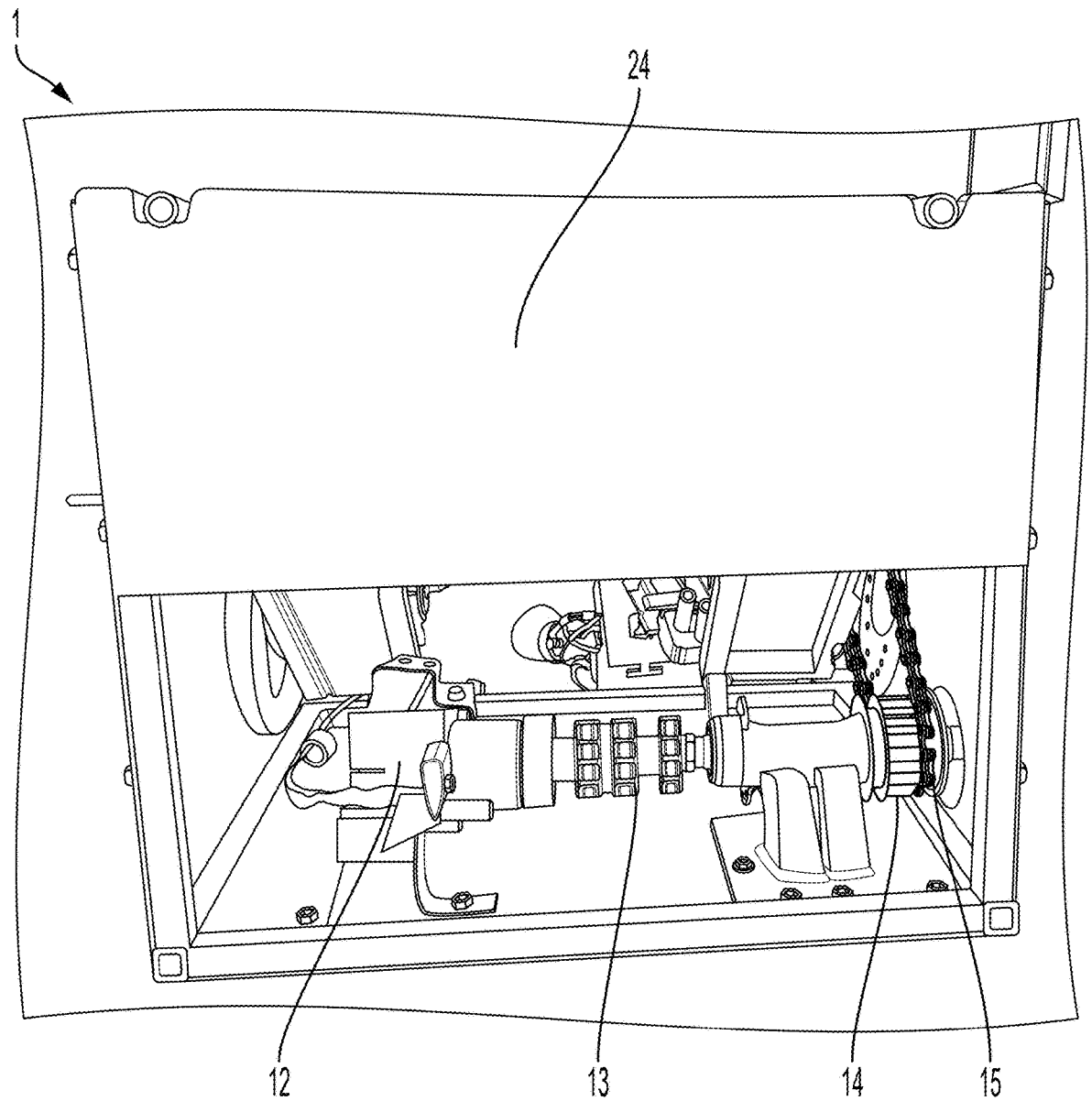
FIG. 10 is a close-up back view of the welding rod dispenser.
Figure 11:
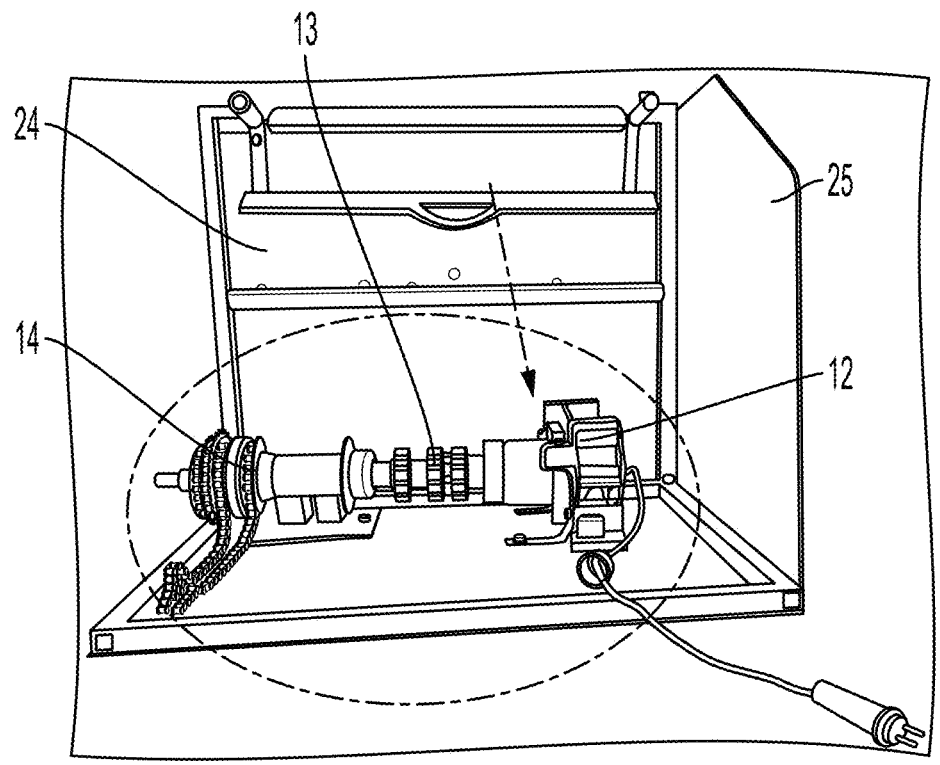
FIG. 11 is a front view of the bottom panel, frame, one side panel, and motor assembly.
Figure 12:
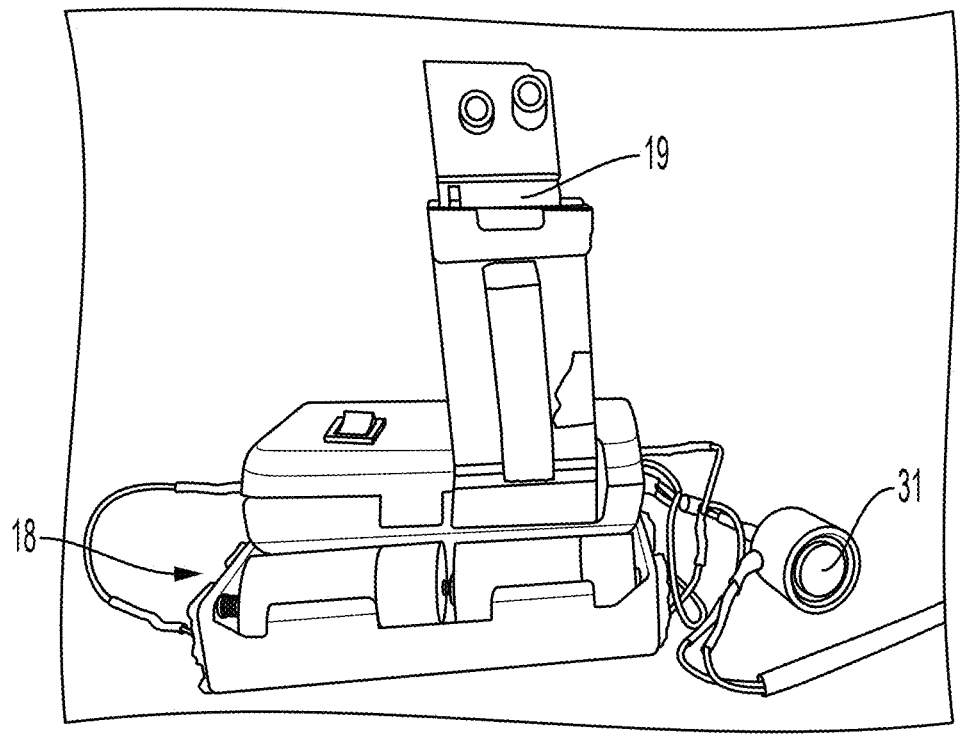
FIG. 12 is a close-up front view of the power source and motion sensor.
Figure 13:
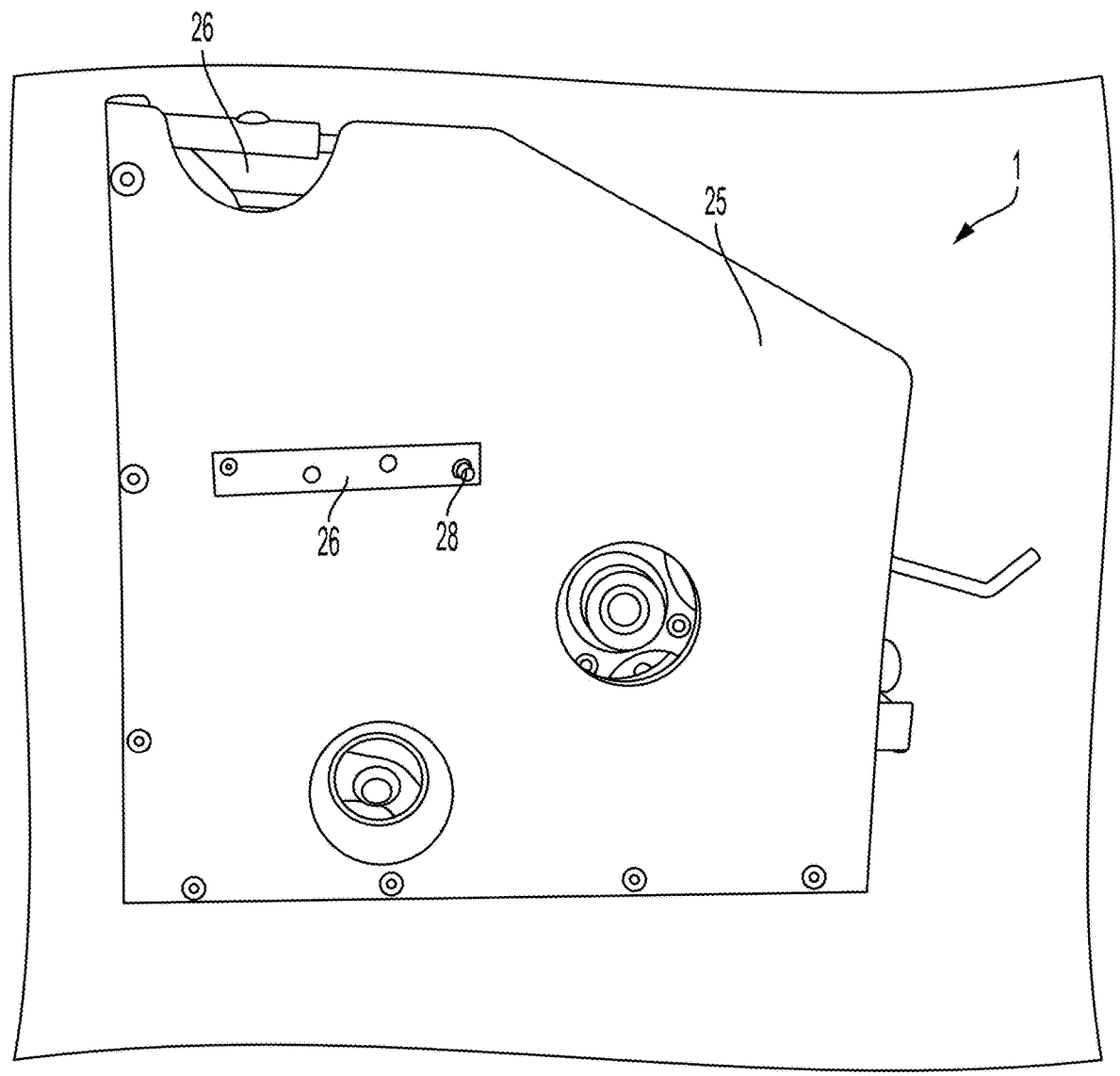
FIG. 13 is a side view of the welding rod dispenser.
Figure 14:
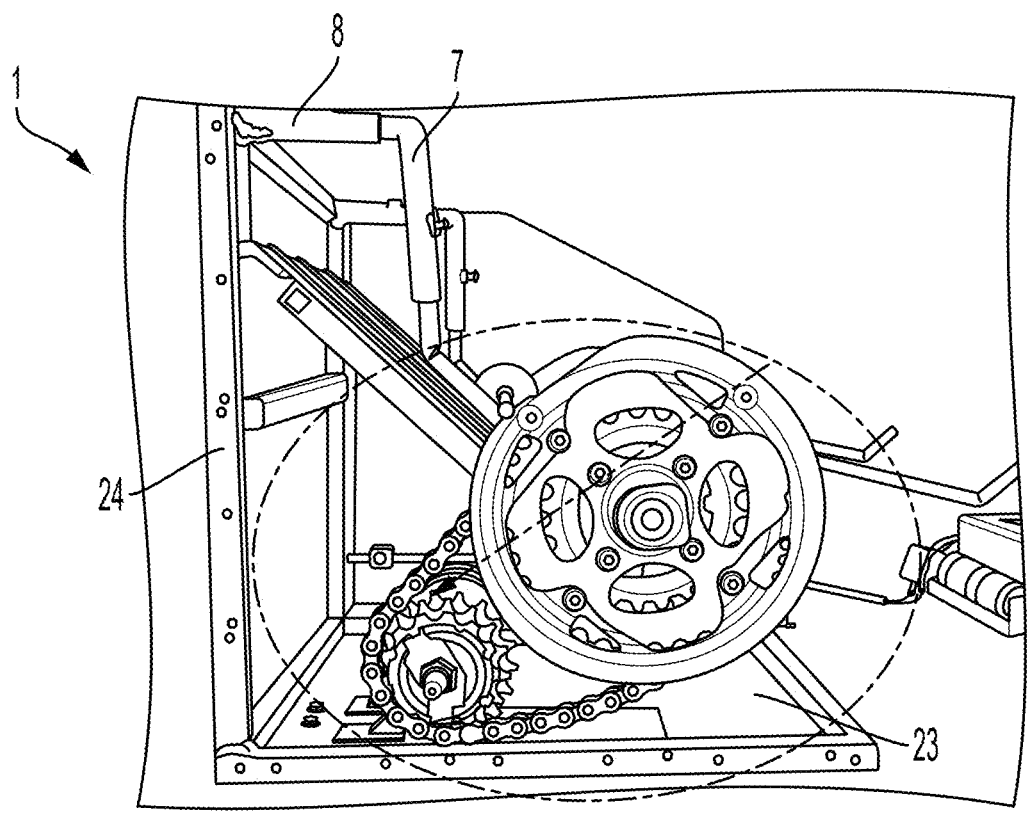
FIG. 14 is a side view of the welding rod dispenser with the side panel removed.
Figure 15:
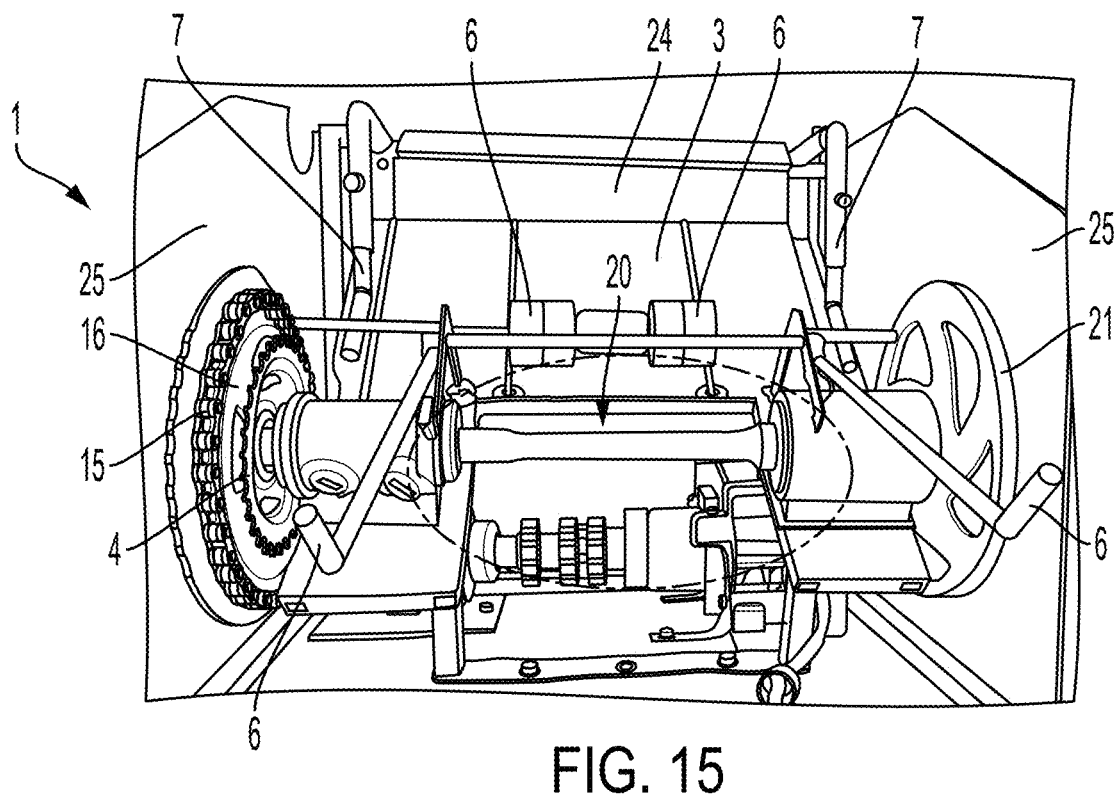
FIG. 15 is a front view of the welding rod dispenser.
Figure 16:
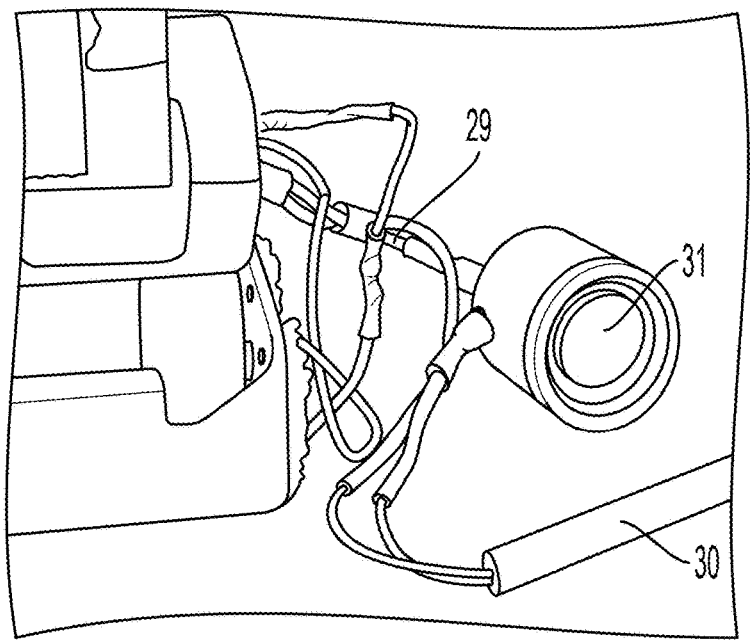
FIG. 16 is a close-up view of the speed adjuster button.
Figure 17:
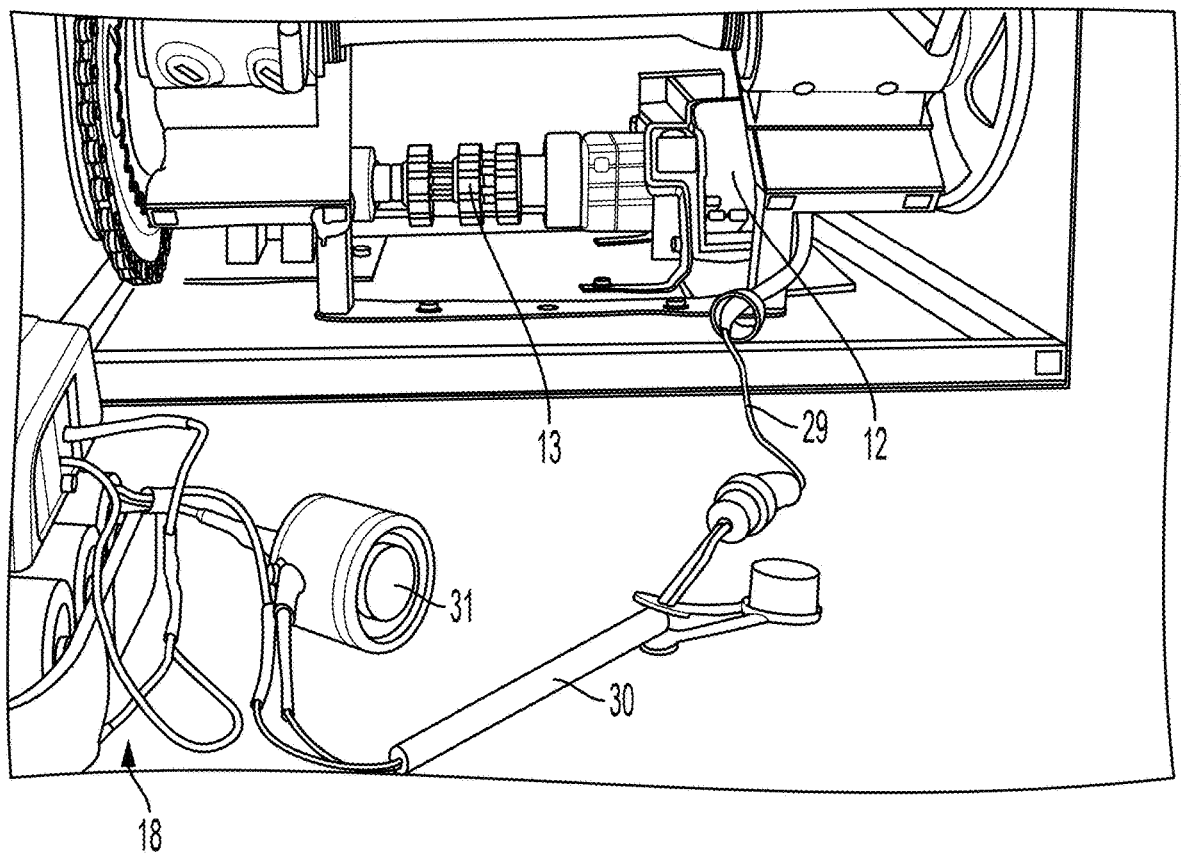
FIG. 17 is a close-up view of the wires and counter device.
Figure 18:
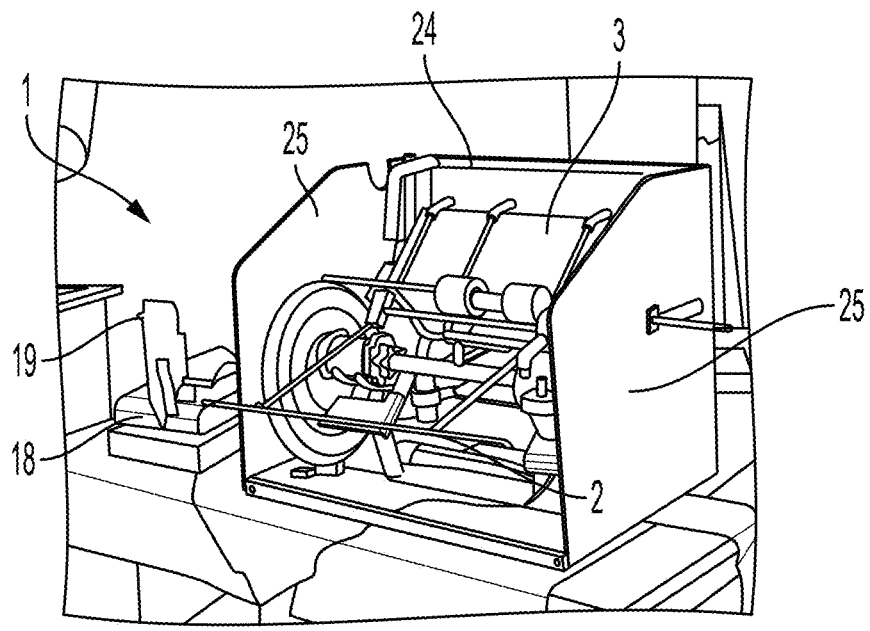
FIG. 18 is a perspective view of the welding rod dispenser in use.
Figure 19:
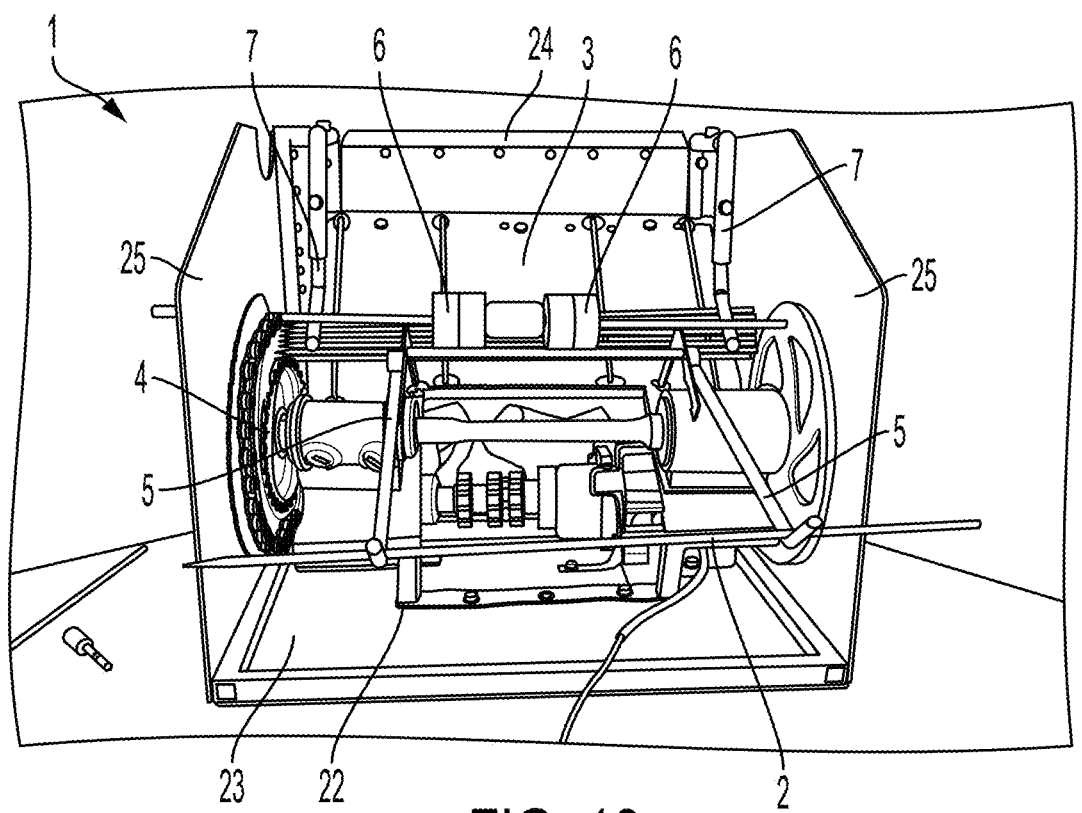
FIG. 19 is a front view of the welding rod dispenser in use.

Other advantages and features will be apparent from the following description and from the claims.

DETAILED DESCRIPTION OF THE INVENTION

The devices and methods discussed herein are merely illustrative of specific manners in which to make and use this invention and are not to be interpreted as limiting in scope.

While the devices and methods have been described with a certain degree of particularity, it is to be noted that many modifications may be made in the details of the construction and the arrangement of the devices and components without departing from the spirit and scope of this disclosure. It is understood that the devices and methods are not limited to the embodiments set forth herein for purposes of exemplification.

In general, in a first aspect, the invention relates to a welding rod dispenser 1. The welding rod dispenser 1 may be capable of automatically dispensing welding rods 2. The welding rod dispenser 2 may also be capable of counting how many welding rods 2 is dispenses. The welding rod dispenser 2 may fit multiple sizes and types of welding rods 2. For example, the welding rod dispenser 2 may fit small, medium, and/or large welding rods 2. The welding rod dispenser 1 itself may be available in multiple sizes depending on the size of the welding rods 2 to be dispensed. The welding rod dispenser 1 may be compact and user friendly, and may keep welding rods 2 contained, in neat order, and easily accessible. The welding rod dispenser 1 may feature motion sensor technology for easy access of the welding rods 2 therein.

The welding rod dispenser 1 may have a deck 3 upon which rods 2 may be stored for dispensing. The deck 3 may be angled, allowing rods 2 stored thereon to slide downward and forward. A set of rotating grabber teeth 4 may be located at the bottom of the deck 3. As the grabber teeth 4 rotate, a single rod 2 stored on the deck 3 may be grabbed by each of the teeth 4 and shifted forward for dispensing.

A pair of arms 5 may be located in front of the rotating grabber teeth 4 such that a rod 2 grabbed by the grabber teeth 4 and shifted forward may be deposited on the arms 5 before rolling forward, where the rod 2 may be easily retrieved by the user. The arms 5 may angle slightly downward from the grabber teeth 4, encouraging the forward roll of the rod 2 after being deposited on the arms 5. The arms 5 may have an upward bend at their distal ends, ensuring that the rods 2 do not roll off the arms 5. Alternately, a different catching device, such as may take the place of the pair of arms 5 and serve the same function.

A plurality of wheels 6 may be located above the deck 3. The wheels 6 may be spaced from the deck 3 sufficiently to allow passage of a single welding rod 2 therebetween. The wheels may provide pressure above the welding rods 2 in the deck 3 to form a single line of welding rods 2, allowing the welding rods 2 to be dispensed evenly.

A pair of levelers 7 may likewise be located above the deck 3. The levelers 7 may attach to the welding rod dispenser 1 via leveler connectors 8 and may allow welding rods 2 to be released based on the size of the rods 2 in a single line fashion. The levelers 7 may be adjustable, capable of adjusting to different sizes of welding rods 2. For example, as shown, each leveler 7 may comprise an L-shaped body 9 with a telescoping arm 10 extending therefrom. The position of the arm 10 relative to the body 9 may be adjusted by sliding the arm 10 in or out of the body 10, and may be secured in place by an attachment device 11, such as a screw as shown or other suitable attachment device. The arm 10 may have a bend at its distal end, as shown, such that the distal end runs parallel to the deck 3. In particular, the levelers 7 may be adjusted to such that the distal ends are spaced from the deck 3 sufficiently to allow passage of a single welding rod 2 therebetween. As such, the levelers 7 may allow for adjustments to allow different size welding rods 2 to go through the dispenser 1.

The rotating grabber teeth 4 may be powered by a motor 12 connected to a drive shaft 13, both of which may be located below the deck 3. The drive shaft 13 may be connected to a bearing 14, which may rotate a chain 15 or rubber belt, which may in turn rotate a gear 16 to which the rotating grabber teeth 4 may be mounted. Thus, the motor 12 may operate the movement of the side gear 16 with grabber teeth 4 to pull welding rods 2 onto the arms 5 for dispensing. A plurality of gears 17 may be included intermediate of the drive shaft 13 and gear 16 to affect the desired rotation. The motor 12 may be powered by a power source 18, such as a battery pack as shown. The power source 18 may optionally be a lithium battery, or any other desired power source. Alternately or additionally, the motor 12 may plug in to a standard wall socket for the power source 18.

A motion sensor 19 may likewise be powered by the power source 18. When activated, the motion sensor may automatically send a signal to the welding rod dispenser 1 to dispense a welding rod 2.

The gear 16 may be connected via a bar 20 to an opposing gear 21. The entire assembly may be supported by a bracket 22, which may be mounted to a bottom panel 23. A frame 24 may extend upward from the back of the bottom panel 23. The back of the deck 3 and the leveler connectors 8 may mount to the frame 24, as shown. The motor 12 and drive shaft 13 may be mounted to the bottom panel 23 under the deck 3. Side panels 25 may extend upward from the sides of the bottom panel 23 and forward from the sides of the frame 24, as shown. At least one of the side panels 25 may have an opening 26 located above the deck 3, below the leveler connectors 8, into which welding rods 2 may be inserted to refill the welding rod dispenser 1. The side panel 25 may also feature a hinge 27 attached to a rod 28 upon which the wheels 6 may be mounted, such that the position of the wheels 6 may be adjusted depending on the size of the welding rods 2.

Wires 29 may connect the sensor 19 and power source 18, collectively the brainbox, to the motor 12. The wires 29 and brainbox may fit neatly within the welding rod dispenser 1. The brainbox may also comprise a counter 30, which may be able to count welding rods 2 dispensed, as well as a speed adjuster 31 capable of adjusting the speed of the motor 12, and consequently how quickly welding rods 2 are dispensed.

The welding rod dispenser 1 may optionally include a cover. The cover may have a handle, allowing it to be picked up and moved. The welding rod dispenser 1 may optionally be weatherproof. The welding rod dispenser 1 may optionally include a rod warmer capable of warming the rods prior to dispensing. The rod warmer may keep the rods dry on cold, hot, or rainy days. The welding rod dispenser 1 may optionally be illuminated by a light, which may not be too bright. The welding rod dispenser 1 may optionally have one or more feet, which may be adjustable to allow the welding rod dispenser 1 to be leveled for use on any type of surface.

The parts of the welding rod dispenser 1 may be made of steel, aluminum, or other desired materials. The welding rod dispenser 1 may be suitable for use in any shop performing welding. The welding rod dispenser 1 may be capable of accommodating multiple sizes of welding rods 2 for the everyday welder. The welding rod dispenser 1 may feature specialized parts that allow the dispenser 1 to automatically dispense welding rods 2 for the fast-paced environment of a shop. The welding rod dispenser 1 may have a counter capable of counting each rod 2, allowing the shop to improve efficiency and save money. The welding rod dispenser 1 may be useful, compact, and easy to use for welders, companies, and shops.

Whereas, the devices and methods have been described in relation to the drawings and claims, it should be understood that other and further modifications, apart from those shown or suggested herein, may be made within the spirit and scope of this invention.

What is claimed is:

1. A welding rod dispenser comprising:
   a deck, where the deck angles downward from back to front;
   a rotating assembly located at the front of the deck, where the rotating assembly comprises grabber teeth;
   a leveler assembly located atop the deck; and
   a plurality of wheels mounted above and spaced from the deck such that the wheels provide pressure to welding rods located on the deck for even dispensing;
   such that welding rods placed atop the deck tend to slide forward under the leveler assembly and the leveler assembly is capable of leveling them into a single layer where they are grabbed by the grabber teeth one at a time before being moved forward by the rotating assembly.

2. The welding rod dispenser of claim 1 where the leveler assembly is configured to be adjustable such that the leveler assembly is spaced a distance from the deck wherein the distance is defined by a size of the welding rods.

3. The welding rod dispenser of claim 1 where the leveler assembly comprises at least one leveler, each leveler comprising:
   an L-shaped body; and
   a telescoping arm extending from the body, where the telescoping arm has a distal end with a bend equal to the angle of the deck.

4. The welding rod dispenser of claim 1 further comprising a pair of arms extending forward from the rotating assembly such that rods moved forward by the rotating assembly are deposited on the arms.

5. The welding rod dispenser of claim 1 further comprising a motor, where the rotating assembly is turned by the motor.

6. The welding rod dispenser of claim 5 where the motor is located below the deck.

7. The welding rod dispenser of claim 5 further comprising a motion sensor, where the welding rod dispenser is capable of dispensing a welding rod upon activation by the motion sensor.

8. The welding rod dispenser of claim 1 further comprising a counter capable of counting the number of welding rods dispensed by the welding rod dispenser.

9. A method of dispensing welding rods, the method comprising:
   placing a plurality of welding rods atop an angled deck and below a leveler assembly;
   allowing the welding rods to slide forward down the deck;
   allowing the welding rods to be leveled into a single layer by the leveler;
   rotating a rotating grabber assembly with a plurality of grabber teeth such that a single welding rod is grabbed by each of the grabber teeth and is rotated forward;
   allowing the single welding rod to fall forward off the rotating grabber assembly; and
   stopping rotating the rotating grabber assembly when the single welding rod falls off such that only one welding rod is dispensed at a time.

10. The method of claim 9 further comprising catching the single welding rod with a pair of arms extending forward of the rotating grabber assembly.

11. The method of claim 9 further comprising activating the rotating grabber assembly via a motion sensor.

12. The method of claim 9 further comprising adjusting the leveler assembly based on the size of the welding rods.

* * * * *